Patented Mar. 8, 1932

1,848,105

UNITED STATES PATENT OFFICE

ROBERT CALVERT, OF WILMETTE, ILLINOIS, ASSIGNOR TO VAN SCHAACK BROS. CHEMICAL WORKS, INC., OF CHICAGO, ILLINOIS, A CORPORATION OF ILLINOIS

PYROXYLIN COMPOSITION

No Drawing. Application filed November 10, 1927. Serial No. 232,458.

My invention relates to a new and useful pyroxylin composition comprising an hydroxyl-acetal.

It has been known that a mixture of alcohol and ether is a solvent for certain grades of nitrocellulose. The solvent powers of such a mixture are considered by some chemists as due possibly to an oxonium compound of the type

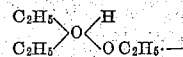

There are instances where the proportion of an alcohol to an ether which could enter into such an oxonium compound is approximately that proportion which gives a mixture of maximum solvent power for pyroxylin.

If the presence of one hydroxyl group for each ether group is important in determining the solvent power, then the monoethyl ether of ethylene glycol, $CH_2OH.CH_2.O.C_2H_5$ should be an excellent solvent for pyroxylin, that is, should withstand a high degree of dilution by such a non-solvent as toluol. Such is the case.

In many lacquers it is desirable to have present a high boiling solvent that is not too rapid or active as a solvent for pyroxylin. In brush lacquer, for example, it is important that the lacquer being brushed over an earlier coat should not dissolve, soften, or "pick up" the earlier coat to an excessive extent.

I have discovered that the hydroxy-acetals provide high boiling solvents that are not as active solvents as butyl acetate or ethylene glycol monoethyl ether, for example.

Aldol dimethyl acetal, an example of the hydroxy-acetals, is more or less typical. Its formula,

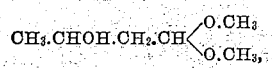

indicates the presence of twice as many ether groups as hydroxyl. By test, it has been shown that a rather concentrated solution of pyroxylin in this solvent will show gelling with less toluol than is required in a parallel test in which either butyl acetate of glycol monoethyl ether is substituted for the aldol dimethyl acetal. This invention is not limited to any theory of the explanation of this difference in solvent power, but takes advantage of the difference regardless of the cause or causes of it.

Specific examples of the practice of my invention follow. Aldol dimethyl acetal, a liquid boiling at 73° C. at a pressure of approximately 13 mm. of mercury, is added to pyroxylin until the latter dissolves. Or, the acetal is used in association with other materials to give the mixtures represented by the following formulas. All parts are by weight.

*Pyroxylin lacquer. Formula #1*

| | Parts |
|---|---|
| Pyroxylin | 10 |
| Aldol dimethyl acetal | 40 |
| Toluol | 60 |

*Pyroxylin lacquer. Formula #2*

| | Parts |
|---|---|
| Pyroxylin | 10 |
| Aldol dimethyl acetal | 3 |
| Butyl acetate | 20 |
| Ethyl acetate | 10 |
| Butyl alcohol | 5 |
| Denatured ethyl alcohol (2B) | 5 |
| Toluol | 45 |
| Naphtha (petroleum) 58° Bé | 12 |

*Pyroxylin and resin lacquer. Formula #3*

| | Parts |
|---|---|
| Formula #2 | 110 |
| Ester gum ("Paramet") | 3 |

*Plasticized pyroxylin and resin lacquer. Formula #4*

| | Parts |
|---|---|
| Formula #3 | 113 |
| Dibutyl phthalate | 3 |

*Pigmented lacquer. Formula #5*

| | Parts |
|---|---|
| Formula #3 | 116 |
| Zinc oxide | 2 |

Lacquers containing the so-called "alcohol-soluble" pyroxylin are illustrated by the following formulas:

*Lacquer #6*

| | Parts |
|---|---|
| Alcohol-soluble pyroxylin | 10 |
| Aldol dimethyl acetal | 40 |

*Lacquer #7*

| | Parts |
|---|---|
| Alcohol-soluble pyroxylin | 5 |
| Aldol dimethyl acetal | 4 |
| Denatured ethanol or butanol | 10 |

*Lacquer #8*

| | Parts |
|---|---|
| Alcohol-soluble pyroxylin | 10 |
| Aldol dimethyl acetal | 6 |
| Denatured alcohol | 3 |
| Butanol | 3 |
| Toluol or petroleum naphtha (58° Bé.) | 3 |

*Lacquer #9*

| | Parts |
|---|---|
| Lacquer #8 | 25 |
| Ester gum ("Paramet") | 5 |

*Lacquer #10*

| | Parts |
|---|---|
| Lacquer #9 | 30 |
| Dibutyl phthalate | 5 |

Many variations may be made without departing from the spirit of my invention. Thus I may use other hydroxy-acetals, as for example, the diethyl acetal of glycollic aldehyde, $CH_2.OH.CH(OC_2H_5)_2$, boiling at 8 mm. at 57-8° C., or aldol diethyl acetal, $CH_3.CHOH.CH_2.CH(OC_2H_5)_2$.

Another hydroxy-ether in which there are more ether than alcohol groups, and which I may use in conjunction with pyroxylin, is ethylidene ethyl hydroxy-ethyl ether,

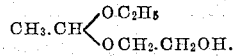

Another is the diether of glycerine, $CH_2OH.CHOC_2H_5.CH_2OC_2H_5$.

I may use other gums than ester, as, for example, dammar, and other plasticizers than dibutyl phthalate, as, for example, diamyl phthalate. The proportions of ingredients may be varied widely. Thus, the proportion of hydroxy-acetal to dibutyl phthalate may be decreased or increased to produce different drying conditions in the lacquer film. Other volatile solvents or diluents may be used, as, for example, benzol, amyl acetate, ethyl lactate, or ethyl butyl acetal. Different concentrations of pyroxylin may be used in the lacquer. While I have used to advantage pyroxylin of so-called "half-second" viscosity that contains about 12% of nitrogen, pyroxylin of other viscosities may be used.

In the presence of free acid, especially of a mineral acid such as nitric or nitrous which may develop in a pyroxylin composition, an acetal may decompose slowly to give an aldehyde and an alcohol. For this reason, I may add to the solution containing the acetal and pyroxylin some material to prevent the accumulation of an undesirable concentration of acid. Such a material I call a stabilizer. Examples of stabilizers which I may use are zinc acetate, urea, zinc oxide, and white lead.

I claim:

1. A composition of matter comprising pyroxylin and an hydroxy-acetal.
2. A composition of matter comprising pyroxylin, an hydroxy-acetal and a resin.
3. A composition of matter comprising pyroxylin, an hydroxy-acetal, a resin, and a plasticizer.
4. A composition of matter comprising pyroxylin, an hydroxy-acetal, a resin, and dibutyl phthalate.
5. A composition of matter comprising pyroxylin and aldol dimethyl acetal.
6. A composition of matter comprising pyroxylin, aldol dimethyl acetal, and a resin.
7. A composition of matter comprising pyroxylin, aldol dimethyl acetal, a resin, and a plasticizer.
8. A composition of matter comprising pyroxylin, aldol dimethyl acetal, a resin, and dibutyl phthalate.
9. A composition of matter comprising pyroxylin, aldol dimethyl acetal, and butyl alcohol.
10. A composition of matter comprising 10 parts by weight of pyroxylin and 4 parts of aldol dimethyl acetal.
11. A lacquer comprising pyroxylin, aldol dimethyl acetal, a resin, and a substantially non-volatile ester.
12. A lacquer comprising pyroxylin, aldol dimethyl acetal, a resin, and a substantially non-volatile ester in amount equal to at least one-third the weight of the aldol dimethyl acetal.
13. A lacquer comprising pyroxylin, aldol dimethyl acetal, a resin, and a substantially non-volatile ester in amount substantially equal to the weight of the aldol dimethyl acetal.
14. A lacquer comprising pyroxylin, aldol dimethyl acetal, a resin, and dibutyl phthalate in amount equal to at least one-third the weight of the aldol dimethyl acetal.
15. A lacquer comprising pyroxylin, aldol dimethyl acetal, a resin, and dibutyl phthalate in amount substantially equal to the weight of the aldol dimethyl acetal.
16. A composition of matter suitable for use as a lacquer, said composition containing alcohol-soluble pyroxylin and an hydroxy-acetal.
17. A composition of matter suitable for use as a lacquer, said composition containing alcohol-soluble pyroxylin and aldol dimethyl acetal.
18. A composition of matter comprising pyroxylin, aldol dimethyl acetal, and a stabilizer.
19. A composition of matter comprising pyroxylin, an hydroxy acetal, and a pigment capable of reacting with nitric acid to give a salt.

ROBERT CALVERT.